United States Patent
Li

(10) Patent No.: US 10,666,037 B2
(45) Date of Patent: May 26, 2020

(54) PROTECTION AND CONTROL SYSTEM FOR INTELLIGENT SUBSTATION BASED ON INDUSTRIAL INTERNET ARCHITECTURE

(71) Applicant: Kyland Technology Co., Ltd., Beijing (CN)

(72) Inventor: Ping Li, Beijing (CN)

(73) Assignee: KYLAND TECHNOLOGY CO., LTD, Beijing (CN)

( * ) Notice: Subject to any disclaimer, the term of this patent is extended or adjusted under 35 U.S.C. 154(b) by 552 days.

(21) Appl. No.: 15/404,535

(22) Filed: Jan. 12, 2017

(65) Prior Publication Data

US 2018/0090921 A1    Mar. 29, 2018

(30) Foreign Application Priority Data

Sep. 29, 2016  (CN) .......................... 2016 1 0865599

(51) Int. Cl.
*H02H 1/00* (2006.01)
*H02J 13/00* (2006.01)
(Continued)

(52) U.S. Cl.
CPC ....... *H02H 1/0092* (2013.01); *G05B 19/0425* (2013.01); *H02H 7/20* (2013.01);
(Continued)

(58) Field of Classification Search
CPC ..... H02H 1/0092; H02H 7/20; H02J 13/0062; H04L 61/2007; G05B 19/0425
See application file for complete search history.

(56) References Cited

U.S. PATENT DOCUMENTS

2008/0262820 A1    10/2008  Nasle
2012/0123603 A1*   5/2012   Werner .................. H02H 7/261
                                                      700/292
(Continued)

FOREIGN PATENT DOCUMENTS

CN    102545387 A    7/2012
CN    105515189 A    4/2016
(Continued)

OTHER PUBLICATIONS

Bartel, P, European Search Report, European Patent Application No. EP 16207223, dated Aug. 4, 2017, 7 pages, European Patent Office, Munich Germany.

*Primary Examiner* — Nathan L Laughlin
(74) *Attorney, Agent, or Firm* — Crain, Caton and James

(57) ABSTRACT

The present application relates to a protection and control system for an intelligent substation based on an industrial Internet architecture. The intelligent substation changes a decentralized modeling manner of firstly adding physical apparatuses and then adding functions of the apparatuses in a traditional substation, but adopts a centralized modeling manner of adding all of protection, measurement and control, exchange and telecontrol functions in substation configuration descriptions by taking the whole substation as a modeling object. The intelligent substation changes an operating mode of accessing merging unit and intelligent terminal integrated devices to different physical apparatuses to realize measurement and control and various protections respectively in the traditional substation, while the intelligent power server collects process level data in real time through an embedded high-bandwidth switched communication network and performs real-time data processing on the collected process level data, thereby realizing all the
(Continued)

protection and measurement and control over primary devices.

15 Claims, 5 Drawing Sheets

(51) Int. Cl.
    *G05B 19/042*     (2006.01)
    *H02H 7/20*     (2006.01)
    *H04L 29/12*     (2006.01)
    *H04L 12/24*     (2006.01)

(52) U.S. Cl.
    CPC ...... *H02J 13/0062* (2013.01); *H04L 61/2007* (2013.01); *G05B 2219/21154* (2013.01); *G05B 2219/25032* (2013.01); *H04L 41/12* (2013.01); *H04L 41/14* (2013.01); *Y02B 90/2638* (2013.01); *Y02E 60/724* (2013.01); *Y04S 10/18* (2013.01); *Y04S 40/124* (2013.01)

(56) References Cited

U.S. PATENT DOCUMENTS

| | | | | |
|---|---|---|---|---|
| 2014/0126576 A1* | 5/2014 | Kumagai | ............... | H04W 40/02 370/392 |
| 2014/0282021 A1* | 9/2014 | Dolezilek | ............... | H04L 41/22 715/735 |
| 2015/0193558 A1* | 7/2015 | Jang | ....................... | G06Q 50/06 703/1 |

FOREIGN PATENT DOCUMENTS

| | | |
|---|---|---|
| JP | 2002315082 A | 10/2002 |
| JP | 2013164731 A | 8/2013 |
| JP | 2016116291 A | 6/2016 |
| WO | 2010118550 A1 | 10/2010 |
| WO | 2012015508 A1 | 2/2012 |
| WO | 2015063815 A1 | 7/2015 |

\* cited by examiner

PROTECTION AND CONTROL SYSTEM FOR INTELLIGENT SUBSTATION BASED ON INDUSTRIAL INTERNET ARCHITECTURE

CROSS-REFERENCE TO RELATED APPLICATIONS

This application claims priority to Chinese patent application No. 201610865599.4, filed on Sep. 29, 2016, which is incorporated by reference herein in its entirety.

TECHNICAL FIELD

Embodiments of the disclosure relate to the technical field of intelligent substations, and in particular relate to a protection and control system for an intelligent substation based on an industrial Internet architecture.

BACKGROUND

An intelligent substation is a substation having primary and secondary devices of the substation as intelligent objects, and capable of realizing information sharing and interoperation by standardizing intelligent information based on a high-speed network communication platform and also capable of realizing automation functions such as measurement monitoring, control and protection, information management and the like based on network data.

The intelligent substation includes a station level, a bay level and a process level, and effective contact is mainly performed among different levels through optical cables. Each level includes different systems, devices and apparatuses which co-act and are cooperated with one another. The station level needs to record and collect electrical energy and related operating data of the substation in real time and is a platform allowing operators to know an operating state of the intelligent substation all the time. The bay level mainly includes secondary devices such as a measurement and control apparatus or a protection apparatus, and mainly completes measurement, control and protection of the devices on the process level.

In the related art, the substation is divided into a high-voltage line part, a main transformer part and a medium voltage side part. Each part is further divided into different device bays. Because the protection apparatuses are classified according to the device bays divided by functions, a plurality of types of protection apparatuses may exist in each bay of the substation. If N types of protection apparatuses exist at a bay, intelligent terminals and merging units for the bay need to be respectively connected to the protection apparatuses through N lines. Therefore, due to numerous secondary devices on the bay level, floor space of the secondary devices is large, and debugging and maintenance workload is relatively high. Moreover, wiring on the process level is complicated and tedious, and difficulty of construction is high, so that the cost of the whole substation is high.

The intelligent terminals stated above are intelligent assemblies. The intelligent terminals are connected to primary devices, such as a circuit breaker, knife switch and main transformer and the like, through cables, and connected to secondary devices for protecting, measuring and controlling and the like through optical fibers, so as to achieve measurement function, control function and the like over the primary devices. Specifically, the intelligent terminals mainly have the following functions:

receiving control instructions for trip protection and tripping;
receiving and executing opening/closing control instructions from a measuring and control device;
uploading position signals of knife switches;
collecting and uploading temperature data/humidity data.

SUMMARY

In view of this, embodiments of the disclosure provide a protection and control system for an intelligent substation based on an industrial Internet architecture, so that the technical problems of numerous secondary devices, large floor space and high construction and maintenance difficulty in the related art are solved.

Embodiments of the disclosure provide a protection and control system for an intelligent substation based on an industrial Internet architecture, including an intelligent power server and merging unit and intelligent terminal integrated devices for all bays in the intelligent substation;

the intelligent power server includes: a processor; and a storage device communicably connected with the processor for storing instructions executable by the processor, wherein execution of the instructions by the processor causes the processor to realize all of a measurement and control function, a protection function, an exchange function and a telecontrol function in the intelligent substation, the intelligent substation adopts a centralized modeling manner of adding and updating all of the protection function, the measurement and control function, the exchange function and the telecontrol function in substation configuration descriptions (SCD) files by taking the whole intelligent substation as a modeling object;

the merging unit and intelligent terminal integrated devices for all bays in the intelligent substation are directly accessed to the intelligent power server, the processor is further caused to collect process level data in real time in a manner of accessing each of the merging unit and intelligent terminal integrated devices to one of transport ports on the intelligent power server through an embedded high-bandwidth switched communication network, perform real-time data processing on the collected process level data, so as to realize all of protection and measurement and control over primary devices connected to the merging unit and intelligent terminal integrated devices.

According to the protection and control system for an intelligent substation based on the industrial Internet architecture provided by embodiments of the disclosure, the merging unit and intelligent terminal integrated devices for all bays in the intelligent substation are directly accessed to the intelligent power server, and each merging unit and intelligent terminal integrated device is accessed to the intelligent power server through an embedded high-bandwidth switched communication network. Specifically, the process level data is collected in real time in a manner of accessing each merging unit and intelligent terminal integrated device to one of transport ports on the intelligent power server merely through one physical link, and real-time data processing is performed on the collected process level data, thereby realizing all of the protection and measurement and control over the primary devices connected to the merging unit and intelligent terminal integrated devices. The intelligent substation adopts the centralized modeling manner of directly adding and updating all of the protection function, the measurement and control function, the exchange function and the telecontrol function in the SCD by taking the whole intelligent substation as a modeling object, thereby changing a decentralized modeling manner of firstly adding physical apparatuses and then adding functions of the apparatuses in a traditional substation, and realizing definition of each special function in the intelligent substation through software. With the above technical solution, the number of secondary devices in the substation and floor space of the substation are reduced, construction and maintenance difficulty of the substation and power consumption of the substation are reduced, investment cost of the substation is further reduced, and the technical problems of numerous secondary devices of the substation, large floor space and high construction and maintenance difficulty in the related art are solved.

BRIEF DESCRIPTION OF DRAWINGS

In order to more clearly describe the technical solution of exemplary embodiments of the disclosure, the drawings to be used in descriptions of the embodiments are simply introduced below. Apparently, the introduced drawings are only drawings of a part of embodiments to be described in the disclosure, but not all of drawings. Those ordinary skilled in the art may obtain other drawings according to the drawings without paying creative work.

DETAILED DESCRIPTION

Figure 1:
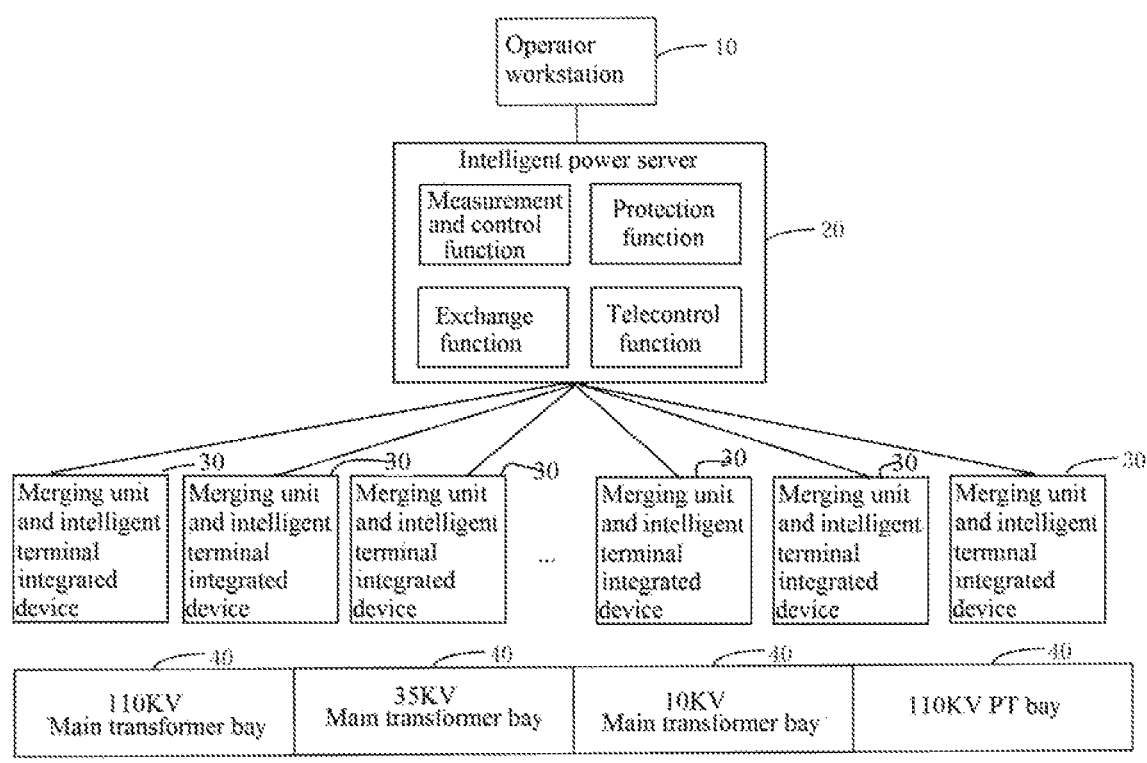
FIG. 1 is a structural schematic diagram illustrating a protection and control system for an intelligent substation based on an industrial Internet architecture provided by embodiment I of the disclosure.

The disclosure is further described below in details by combining the drawings and embodiments. It should be understood that, specific embodiments described herein are only used for illustrating the disclosure, not limiting the disclosure. In addition, it should be noted that, in order to conveniently describe, only a part of contents related to the disclosure, but not all of contents, are illustrated in the drawings.

It should be mentioned that, some exemplary embodiments are described to serve as processing or methods of flow chart description before the exemplary embodiments are discussed in details. Although various operations (or steps) are described into sequential processing in the flow chart, many operations therein can be implemented concurrently, concomitantly or simultaneously. In addition, a sequence of the various operations can be rearranged. The processing can be ended when the operations are completed, however, the processing may also include additional steps which are not included in the drawings. The processing can correspond to methods, functions, procedures, subroutines, subprograms and the like.

A protection and control system for an intelligent substation based on an industrial Internet architecture includes an intelligent power server and merging unit and intelligent terminal integrated devices for all bays in the intelligent substation. Further, the protection and control system for an intelligent substation can further include an operator workstation.

Firstly, the merging unit and intelligent terminal integrated devices for all bays in the intelligent substation are directly accessed to the intelligent power server. The intelligent power server collects process level data in real time in a manner of accessing each of the merging unit and intelligent terminal integrated devices to one transport port on the intelligent power server through an embedded high-bandwidth switched communication network, and real-time data processing on the collected process level data is completed, thereby realizing all of the protection and measurement and control over the primary devices connected to the merging unit and intelligent terminal integrated devices. Specifically, the embedded high-bandwidth switched communication network may be a controller area network (CAN) bus, a field Internet protocol (IP) bus, a Modbus bus, a process field bus (Profibus), a highway addressable remote transducer (HART) open communication protocol bus, a foundation field (FF) field bus or an optical fiber. For each of the merging unit and intelligent terminal integrated devices, it is accessed to one of transport ports on the intelligent power server through an embedded high-bandwidth switched communication network. The merging unit and intelligent terminal integrated devices for all bays in the intelligent substation are directly accessed to the transport ports on the intelligent power server without being transferred via a switch, thereby shortening time delay in the process of message transmission and reception and improving real-time property of the message transmission.

Illustratively, in the disclosure, the merging unit and intelligent terminal integrated devices for all bays in the intelligent substation are directly accessed to the intelligent power server, and each merging unit and intelligent terminal integrated device is accessed to one transport port on the intelligent power server merely through one physical link. Specifically, each merging unit and intelligent terminal integrated device is connected to one transport port of the intelligent power server merely through a pair of optical fibers. A transport port of the intelligent power server includes a reception port and a transmission port. Each merging unit and intelligent terminal integrated device is accessed to the reception port of one transport port on the intelligent power server through one optical fiber, and the merging unit and intelligent terminal integrated device is accessed to the transmission port of the transport port on the intelligent power server through another optical fiber. The intelligent power server collects the process level data (for example, collects sampled value (SV) messages and generic object oriented substation event (GOOSE) messages transmitted by the merging unit and intelligent terminal integrated devices) in real time merely through one physical link, and processes in real time the process level data collected in real time, thereby realizing all of the protection and measurement and control over the primary devices connected to the merging unit and intelligent terminal integrated devices. However, one merging unit and intelligent terminal integrated device in a traditional substation needs to be accessed to a plurality of different physical apparatuses, thereby realizing the measurement and control and protection of the primary devices connected to the merging unit and intelligent terminal integrated devices through the different physical apparatuses separately.

The intelligent power server is configured to realize all of the measurement and control function, the protection function, the exchange function and the telecontrol function in the intelligent substation.

Illustratively, the intelligent power server completes real-time data processing on the collected process level data, thereby realizing the protection and measurement and control over the primary devices connected to the merging unit and intelligent terminal integrated devices. In addition, the intelligent power server can further forward the process level data transmitted by the merging unit and intelligent terminal integrated devices to a network analyzer and a fault recording system, thereby realizing data exchange between the merging unit and intelligent terminal integrated devices and devices on the process level. The intelligent power server can be further configured to realize data exchange between the intelligent power server and devices on the process level, data exchange among devices on the process level and data exchange among devices on the station level. Further, the intelligent power server can further collect information generated in a process of protection and measurement and control special functions through the telecontrol function and transmit the information to the devices on the station level or the operator workstation.

More importantly, the intelligent substation in the disclosure adopts a centralized modeling manner. The intelligent substation adopts a centralized modeling manner of adding and updating all of the protection function, the measurement and control function, the exchange function and the telecontrol function in substation configuration descriptions by taking the whole intelligent substation as a modeling object, thereby realizing definition of each special function in the intelligent substation through software. The special functions of the intelligent substation in the disclosure include: the protection function, the measurement and control function, the exchange function and the telecontrol function.

Specifically, the centralized modeling manner is as follows: a system configuration description (SCD) tool of the substation creates SCD files of the intelligent substation according to the merging unit and intelligent terminal integrated devices and each special function planned by the intelligent substation, and configuration information of each of the special functions is set in the SCD files of the intelligent substation. Each special function of the intelligent substation is set according to application scenarios of the intelligent substation. The intelligent power server is further configured to generate configured intelligent electronic device description (CID) files of the intelligent power server according to the SCD files of the intelligent substation, parse the CID files of the intelligent power server to acquire the configuration information of each special function, and realize all of the measurement and control function, the protection function, the exchange function and the telecontrol function in the intelligent substation according to the configuration information of each special function and the SV messages and GOOSE messages transmitted by the merging unit and intelligent terminal integrated devices.

When special functions are added or updated in the intelligent substation, configuration information related to the added or updated special functions is set in the SCD files of the intelligent substation, and process level virtual terminators for the added or updated special functions are associated in the SCD files of the intelligent substation.

Illustratively, different special functions are set for different application scenarios of the intelligent substation. The SCD files are created in two modes, one of which is as follows: the SCD file configuration tool directly sets configuration information of each special function and configuration information of each merging unit and intelligent terminal in the SCD files, and associates the process level virtual terminators. When demands of the intelligent substation are changed and it is required to add new special functions or update the existing special functions, the SCD file configuration tool directly adds or updates configuration information of the corresponding special functions in the SCD files of the intelligent substation, and directly associates process level virtual terminators of the added or updated special functions in the SCD files. The intelligent power server generates the CID files of the intelligent power server according to the SCD files of the intelligent substation. When in operation, the intelligent power server parses the CID files of the intelligent power server so as to acquire the configuration information of each special function, and realizes all of the protection function, the measurement and control function, the exchange function and the telecontrol function in the intelligent substation according to the configuration information of each special function and the SV messages and GOOSE messages transmitted by the merging unit and intelligent terminal integrated devices.

The other mode of creating the SCD files is as follows: firstly, intelligent electronic device capability description (ICD) files of the intelligent power server are created, and each special function is set in the ICD files of the intelligent power server; then, the SCD file configuration tool generates SCD files of the whole intelligent substation according to the ICD files of the intelligent power server and the ICD files of the merging unit and intelligent terminal integrated devices, and associates process level virtual terminators in the SCD files. The intelligent power server generates the CID files of the intelligent power server according to the SCD files of the intelligent substation. When in operation, the intelligent power server parses the CID files of the intelligent power server so as to acquire the configuration information of each special function, and realizes all of the protection function, the measurement and control function, the exchange function and the telecontrol function in the intelligent substation according to the configuration information of each special function and the SV messages and GOOSE messages transmitted by the merging unit and intelligent terminal integrated devices. When the demands of the intelligent substation are changed and it is needed to add new special functions or update the existing special functions, corresponding special functions are added or updated in the ICD files of the intelligent power server firstly; then the SCD file configuration tool regenerates the SCD files of the whole intelligent substation according to the ICD files of the intelligent power server and the ICD files of the merging unit and intelligent terminal integrated devices, and associates process level virtual terminators in the SCD files.

However, in the related art, each protection apparatus and each measurement and control apparatus are separately modeled. Each apparatus has an ICD file. Then, the ICD file of each apparatus is imported into the SCD tool to conduct unified instance configuration, thereby generating the SCD file of the whole system. Then, the contents related to each apparatus in the SCD file are downloaded locally by each apparatus through a special tool so as to form the CID files. Therefore, the existing decentralized modeling manner of the substation is to firstly add individual physical apparatuses and then add functions of each apparatus. As a result, there are numerous secondary devices, and the whole configuration process is complicated and tedious because the ICD files of each secondary device need to be integrated and instantiated to generate the SCD files, and then the contents related to the apparatus, i.e., the CID file, in the SCD file are downloaded to the apparatus by an apparatus generation manufacturer through the special tool.

According to the protection and control system for an intelligent substation based on the industrial Internet architecture provided by embodiments of the disclosure, the protection and measurement and control over the primary devices connected to the merging unit and intelligent terminal integrated devices are realized in the following manner: the merging unit and intelligent terminal integrated devices for all bays in the intelligent substation are directly accessed to the intelligent power server, and each merging unit and intelligent terminal integrated device is accessed to one optical port on the intelligent power server merely through one physical link, where the intelligent substation adopts the centralized modeling manner of directly adding and updating all of the protection function, the measurement and control function, the exchange function and the telecontrol function in the substation configuration descriptions by taking the whole intelligent substation as a modeling object, thereby changing a decentralized modeling manner of firstly adding physical apparatuses and then adding functions of the apparatuses adopted by a traditional substation and realizing definition of each special function in the intelligent substation through software. With the above technical solution, the number of secondary devices in the substation and floor space of the substation are reduced, construction and maintenance difficulty of the substation and power consumption of the substation are reduced, thereby reducing investment cost of the substation, and solving the technical problems of numerous secondary devices of the substation, large floor space and high construction and maintenance difficulty in the related art.

Embodiment I

FIG. 1 is a structural schematic diagram illustrating a protection and control system for an intelligent substation based on an industrial Internet architecture provided by embodiment I of the disclosure. The intelligent substation can be applied to any power system. As shown in FIG. 1, the intelligent substation can include: an operator workstation 10, an intelligent power server 20, merging unit and intelligent terminal integrated devices 30 and bays 40.

The merging unit and intelligent terminal integrated devices 30 for all bays in the intelligent substation are directly connected to transport ports on the intelligent power server 20, the transport ports and the merging unit and intelligent terminal integrated devices 30 are in a relationship of one-to-one correspondence, and the intelligent power server 20 is connected to the operator workstation 10.

The intelligent power server 20 is configured to realize all of the measurement and control function, the protection function, the exchange function and the telecontrol function in the intelligent substation.

The operator workstation 10 is configured to monitor and manage the operation of the intelligent substation through the intelligent power server 20.

Illustratively, the intelligent substation can be divided into a process level and a substation level. On the process level, the merging unit and intelligent terminal integrated devices 30 are provided by taking the bays 40 as units. One bay 40 may include a plurality of merging unit and intelligent terminal integrated devices 30, and the bays 40 can include main transformer bays, line bays and bus bays, such as a 110 KV main transformer bay, a 35 KV main transformer bay, a 10 KV main transformer bay and a 110 KV PT bay. The intelligent power server 20 and the operator workstation 10 are positioned on the substation level. Actually, each merging unit and intelligent terminal integrated device 30 is connected to the intelligent power server 20 through two optical fibers, that is, a pair of optical fibers, thereby realizing two-way communication between the merging unit and intelligent terminal integrated device and the intelligent power server. Each merging unit and intelligent terminal integrated device 30 corresponds to one optical fiber transport port on the intelligent power server 20, that is, one reception port and one transmission port. The transport ports on the intelligent power server and the merging unit and intelligent terminal integrated devices in a relationship of one-to-one correspondence, that is, the intelligent power server is connected to one merging unit and intelligent terminal integrated device merely through one transport port, and each merging unit and intelligent terminal integrated device is merely accessed to one transport port of the intelligent power server.

The intelligent power server 20 can be configured to realize all of the measurement and control function and protection function in the intelligent substation. Specifically, the intelligent power server 20 can be configured to realize the measurement and control and protection of the primary devices connected to all the merging unit and intelligent terminal integrated devices 30 in the intelligent substation. The primary devices can be understood as devices with power generation, transmission and distribution functions, such as a generator, a transformer, a current transformer, a voltage transformer, an operation box, an electric switch and the like. Specifically, merging units and the intelligent terminals are integrated into one device by the merging unit and intelligent terminal integrated devices 30. The merging unit and intelligent terminal integrated devices 30 transmit the SV messages of the merging units to the intelligent power server 20 in a unified manner and similarly transmit the GOOSE messages of the intelligent terminals to the intelligent power server 20 in a unified manner. The SV messages and the GOOSE messages are carried with operating information of the primary devices. The measurement and control and protection of each merging unit and intelligent terminal integrated device 30 is processed by the intelligent power server 20. Meanwhile, the intelligent power server can further transmit GOOSE messages to the merging unit and intelligent terminal integrated devices according to the SV messages and GOOSE messages transmitted by the merging unit and intelligent terminal integrated devices 30, thereby realizing all of the measurement and control function and protection function in the intelligent substation.

Optionally, because the intelligent power server 20 is connected to the operator workstation 10, the intelligent power server 20 can further collect the measurement and control information and protection information generated in the measurement and control process and the protection process and transmit the information to the operator workstation 10. An operator in the operator workstation 10 can judge operating states of the primary devices according to the received measurement and control information and protection information, and control the primary devices according to the operating states of the primary devices. Specifically, the intelligent power server 20 performs telecontrol control on the primary devices according to the instructions of the operator workstation 10, thereby realizing all of the telecontrol function in the intelligent substation.

Further, the intelligent power server 20 can assign IP addresses to the accessed intelligent primary devices which can include the merging unit and intelligent terminal integrated devices 30, the merging units and the intelligent terminals. Mapping relationship between media access control (MAC) address and the IP address of each intelligent primary device is stored in the intelligent power server 20. In the process of collecting the measurement and control information and protection information, the intelligent power server 20 replaces the MAC addresses in the measurement and control information and the protection information with corresponding IP addresses according to the mapping relationship between the MAC addresses and the IP addresses of the intelligent primary devices, and transmits the measurement and control information and protection information carried with the IP addresses to the operator workstation 10.

If the MAC addresses of the devices such as the current transformer, the voltage transformer, the operation box, the electric switch and the like can be acquired, the intelligent power server in the disclosure can further assign IP addresses to the devices such as the current transformer, the voltage transformer, the operation box, the electric switch and the like, and save the mapping relationship between the IP addresses and the MAC addresses of the devices.

Illustratively, because the operator workstation 10 can identify the IP addresses of the intelligent primary devices, while collection of the measurement and control information and protection information of the intelligent primary devices by the intelligent power server 20 is realized in a manner of identifying the MAC addresses of the intelligent primary devices, the intelligent power server 20 can assign IP address which is unique, to the accessed intelligent primary devices, and store the mapping relationship between the MAC address and the IP address of the intelligent primary device, thereby forming a mapping table between the MAC address and the IP address. Based on the mapping relationship, the intelligent power server 20 replaces the MAC addresses in the measurement and control information and the protection information with corresponding IP addresses, and transmit the measurement and control information and the protection information carried with the IP addresses to the operator workstation 10, thereby guaranteeing that the operator in the operator workstation 10 confirms a source address of the measurement and control information and the protection information. The intelligent substation in embodiments of the disclosure assigns a unique IP address to the intelligent primary devices accessed to the intelligent substation, thereby realizing the cloud control and cloud service of the intelligent substation and laying a technical foundation for development of energy big data and energy Internet.

Optionally, the intelligent power server 20 can be further configured to realize all the exchange functions in the intelligent substation. Specifically, the data exchange between the merging unit and intelligent terminal integrated devices 30 and the devices on the process level, the data exchange between the intelligent power server 20 and the devices on the process level, the data exchange among devices on the process level and the data exchange among the devices on the station level can be realized. It should be understood that, the devices on the station level can be the operator workstations and can also be devices which are connected to the intelligent power server and are configured to manage and monitor the intelligent substation, such as a monitoring host and a data server.

Optionally, in order to adapt to real-time transmission and real-time processing of mass data, a processor of the intelligent power server 20 can adopt a multi-core dual-CPU technology.

The protection and control system for an intelligent substation based on the industrial Internet architecture provided by embodiment I of the disclosure includes the operator workstation, an intelligent power server and the merging unit and intelligent terminal integrated devices for all bays. The merging unit and intelligent terminal integrated devices for all bays are connected to one of the transport ports on the intelligent power server through a pair of optical fibers. The measurement and control and protection of all the primary devices on the process level can be completed by the intelligent power server, and all of the measurement and control function, the protection function, the exchange function and the telecontrol function in the intelligent substation can be realized in a centralized manner, thereby reducing the number of the secondary devices in the substation, reducing the floor space of the substation, reducing the construction and maintenance difficulty of the substation, bringing convenience to maintenance, reducing debugging time, and solving the technical problems of numerous secondary devices, large floor space and high construction and maintenance difficulty in the related art. Meanwhile, overall data exchange between the merging unit and intelligent terminal integrated devices and the substation level is completed by the intelligent power server. Moreover, networking is not needed on the process level, and networking is also not needed on the substation level because only the intelligent power server exists on the substation level, thereby reducing energy consumption and investment cost of the substation.

Embodiment II

Figure 2:
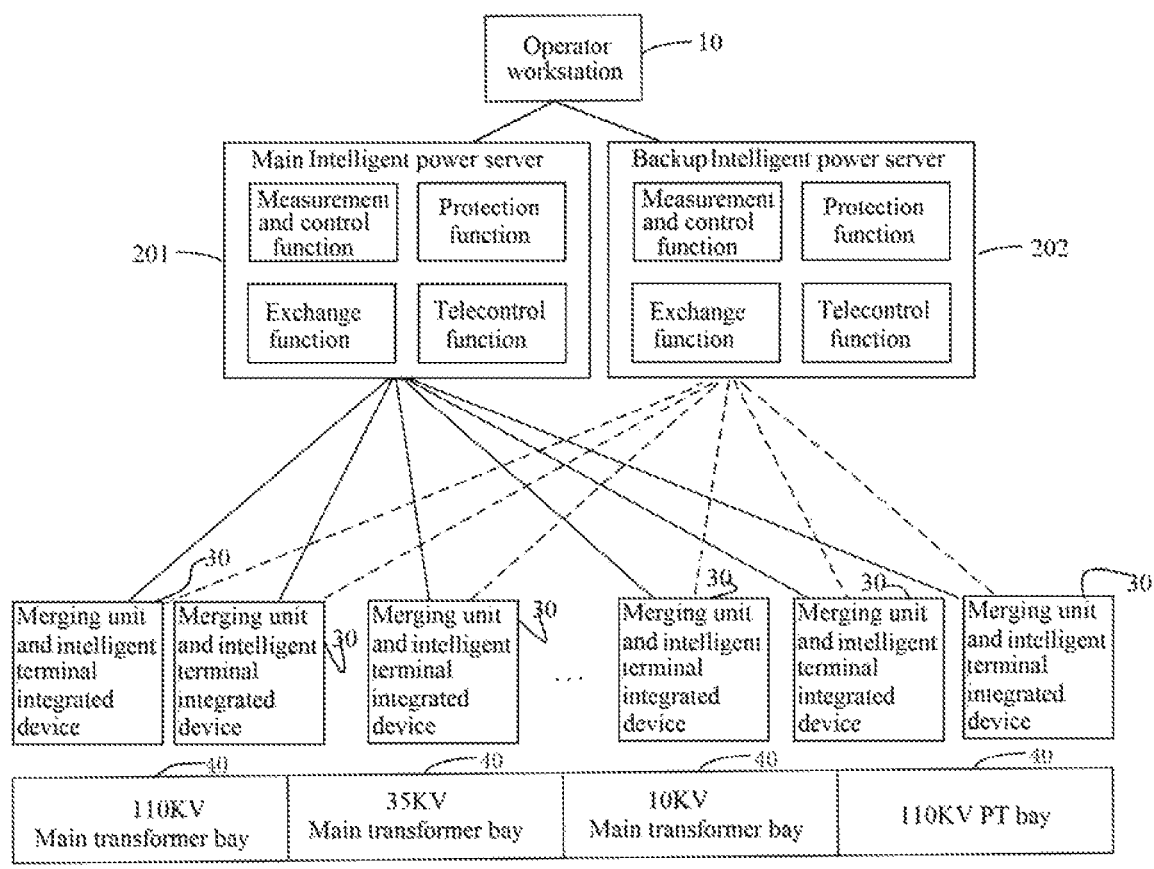
FIG. 2 is a structural schematic diagram illustrating a protection and control system for an intelligent substation based on an industrial Internet architecture provided by embodiment II of the disclosure.

FIG. 2 is a structural schematic diagram illustrating a protection and control system for an intelligent substation based on an industrial Internet architecture provided by embodiment II of the disclosure. The intelligent substation can be applied to any power system. The present embodiment is based on the above embodiment, and is improved on the basis of the above embodiment. As shown in FIG. 2, the intelligent substation can include: the operator workstation 10, a main intelligent power server 201, a backup intelligent power server 202, the merging unit and intelligent terminal integrated devices 30 and the bays 40.

Optionally, the merging unit and intelligent terminal integrated devices 30 for all bays 40 in the intelligent substation are directly connected to the main intelligent power server 201 and the backup intelligent power server 202. Both the main intelligent power server 201 and the backup intelligent power server 202 are connected to the operator workstation 10. Main/backup output signal of main/backup switching interface of the main intelligent power server 201 is connected to input of the backup intelligent power server 202, main/backup input signal of the main/backup switching interface of the main intelligent power server 201 is connected to output of the backup intelligent power server 202, and the main/backup input signal and the main/backup output signal are exclusive to each other. Similarly, main/backup output signal of main/backup switching interface of the backup intelligent power server 202 is connected to input of the main intelligent power server 201, main/backup input signal of the main/backup switching interface of the backup intelligent power server is connected to output of the main intelligent power server 201, and the main/backup input signal and the main/backup output signal are exclusive to each other.

The main intelligent power server and the backup intelligent power server work simultaneously and are configured to realize the same function. When in operation, the output of one of the main intelligent power server and the backup intelligent power server is effective.

Illustratively, the intelligent power server has dual redundancy configuration, that is, the main intelligent power server 201 and the backup intelligent power server 202. Specifically, in the case that the main intelligent power server 201 does not malfunction, the main intelligent power server 201 has functions of inputting, processing and outputting, while the backup intelligent power server 202 merely has functions of inputting and processing without an outputting function. In the case that the main intelligent power server 201 malfunctions, the backup intelligent power server 202 is switched to the main intelligent power server, and the backup intelligent power server serves as output. In the case that the backup intelligent power server in an operating state malfunctions while the main intelligent power server 201 does not malfunctions, the main intelligent power server 201 takes charge of operation of the backup intelligent power server to serve as output, thereby guaranteeing that one of the main intelligent power server 201 and the backup intelligent power server 202 outputs normally.

Further, each merging unit and intelligent terminal integrated device 30 is respectively connected to optical ports of the main intelligent power server 201 and the backup intelligent power server 202 through two optical fibers.

The protection and control system for an intelligent substation based on the industrial Internet architecture provided by embodiment III of the disclosure includes the operator workstation, the main intelligent power server, the backup intelligent power server, the merging unit and intelligent terminal integrated devices and the bays. The merging unit and intelligent terminal integrated devices for all bays in the intelligent substation are directly connected to transport ports on the main intelligent power server and the backup intelligent power server, and both of the main intelligent power server and the backup intelligent power server are connected to the operator workstation, so that special functions such as the measurement and control, protection, exchange, telecontrol and the like, of the whole substation can be integrated into an intelligent power server, and all of the measurement and control function, the protection function, the exchange function and the telecontrol function in the intelligent substation can be realized in a centralized manner, thereby reducing the number of the secondary devices in the substation and further reducing the floor space of the substation. Meanwhile, by providing the main intelligent power server and the backup intelligent power server, when one of the intelligent power servers malfunctions, the other intelligent power server can work, thereby guaranteeing normal operation of the whole intelligent substation. Therefore, response capability of handling emergency events in the intelligent substation is enhanced and the problem that the intelligent substation cannot work due to unforeseen circumstances is avoided.

Embodiment III

Figure 3:
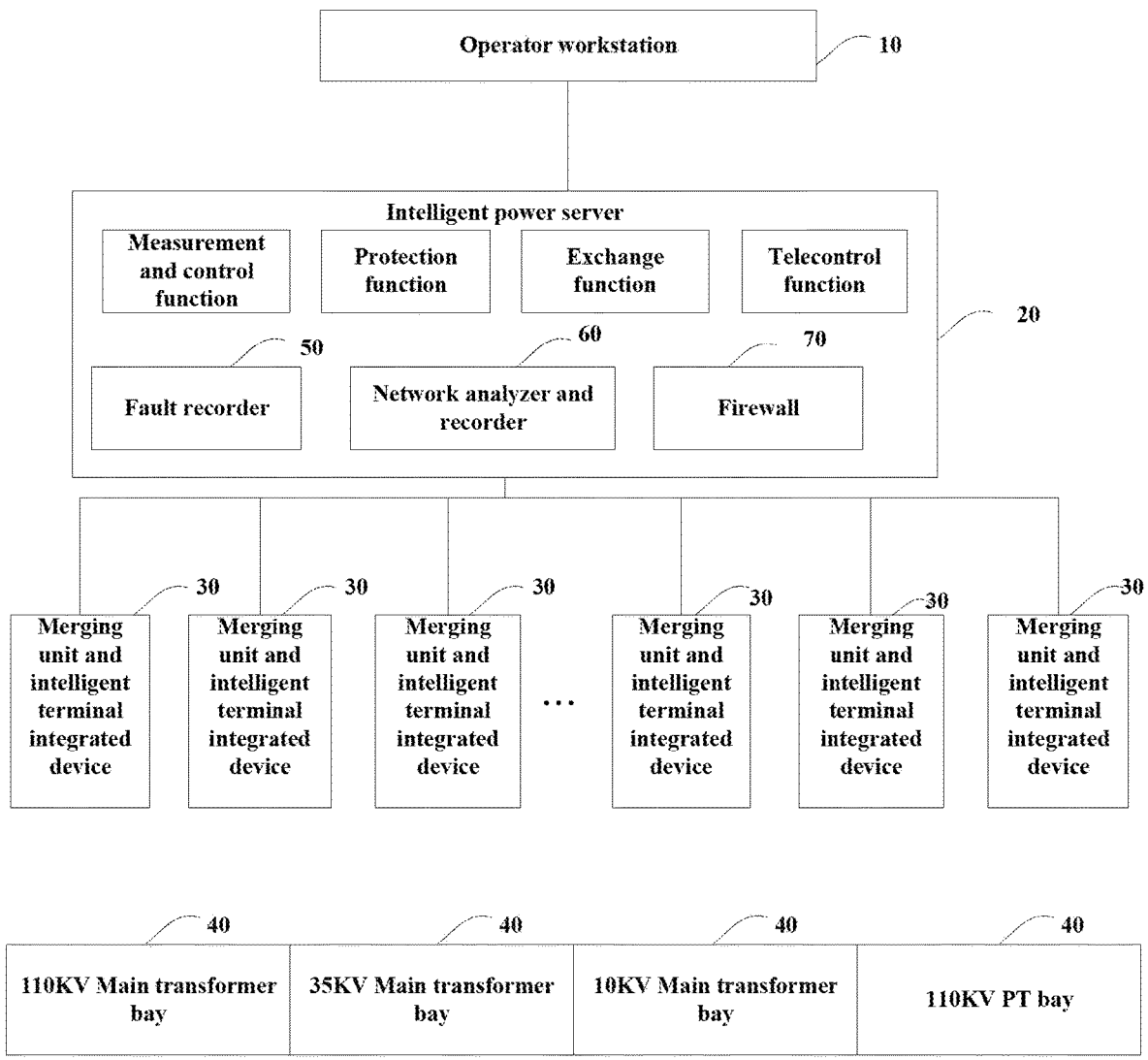
FIG. 3 is a structural schematic diagram illustrating a protection and control system for an intelligent substation based on an industrial Internet architecture provided by embodiment III of the disclosure.
Figure 4:
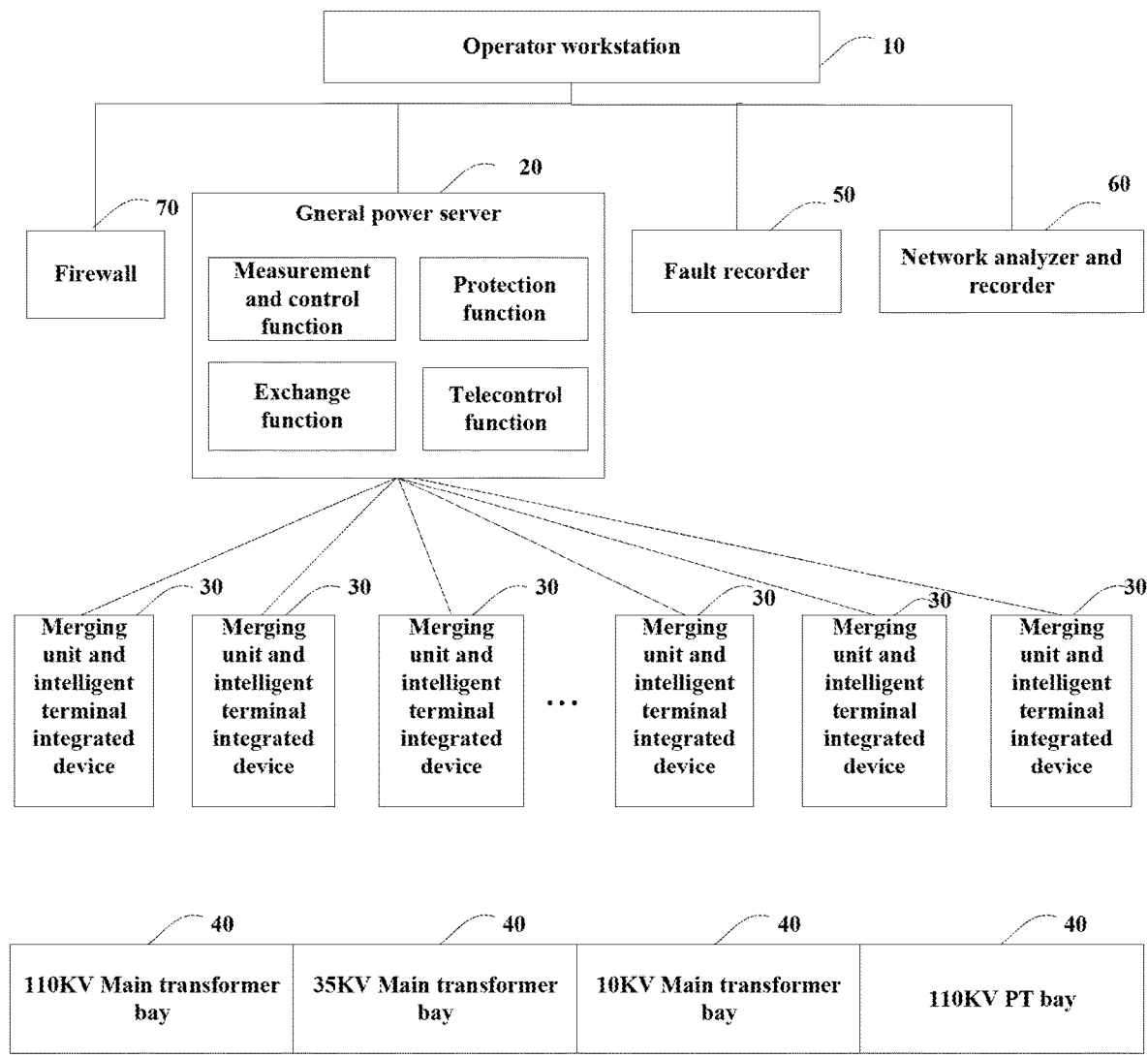
FIG. 4 is a structural schematic diagram illustrating another protection and control system for an intelligent substation based on an industrial Internet architecture provided by embodiment III of the disclosure.

Both of FIG. 3 and FIG. 4 are structural schematic diagrams illustrating a protection and control system for an intelligent substation based on an industrial Internet architecture provided by embodiment III of the disclosure. The intelligent substation can be applied to any power system. The present embodiment is based on the above embodiment, and is improved on the basis of the above embodiment. The intelligent substation can include: the operator workstation 10, the intelligent power server 20, the merging unit and intelligent terminal integrated devices 30, the bays 40, a fault recorder 50, a network analyzer and recorder 60 and a firewall 70.

The merging unit and intelligent terminal integrated devices 30 for all bays in the intelligent substation are directly connected to the transport ports on the intelligent power server 20. The intelligent power server 20 is connected to the operator workstation 10. Each of the fault recorder 50, the network analyzer and recorder 60 and the firewall 70 may be provided in the intelligent power server 20, as shown in FIG. 3. Alternatively, the intelligent power server 20 and each of the fault recorder 50, the network analyzer and recorder 60 and the firewall 70 may be provided separately, as shown in FIG. 4, the firewall 70 can be further connected to a regional dispatching center. The firewall is configured to protect security of the intelligent power server.

Illustratively, the fault recorder 50 can automatically and accurately record change conditions of various electrical quantities before, during and after the fault when the primary devices malfunctions, so as to provide support for maintenance of maintenance personnel. The network analyzer and recorder 60 can automatically analyze and record the operating states of the primary devices to obtain state parameters. According to the network analyzing and recording function, the operator can be helped to know the operating conditions of the primary devices in time and pre-judge and solve possible faults in time.

Optionally, when the intelligent power server 20 and each of the fault recorder 50, the network analyzer and recorder 60 and the firewall 70 are separately provided, the fault recorder 50, the network analyzer and recorder 60 and the firewall 70 are respectively connected to the operator workstation 10. Further, the firewall 70 can contact with the regional dispatching center, such as a local dispatching center, a county dispatching center or a distribution center.

Further, the intelligent power server 20 is further provided with an extensible markup language (XML) database that is configured to record the data messages transmitted by the merging unit and intelligent terminal integrated devices 30, and sort and store the data messages according to the bays 40 to which the merging unit and intelligent terminal integrated devices 30 transmitting the data messages belong, the merging unit and intelligent terminal integrated devices 30 and message types of the data messages.

Illustratively, primary nodes in tree-structured documents of the XML database refer to the bays 40, secondary nodes connected to the primary nodes refer to the merging unit and intelligent terminal integrated devices 30 under the bays 40, and third-level nodes connected to the secondary nodes refer to all the message types of the messages transmitted by the merging unit and intelligent terminal integrated devices 30, including the SV messages and the GOOSE messages. The bay where a message sender is positioned and which merging unit and intelligent terminal integrated device is the sender can be determined by parsing the source addresses of the messages. The XML database can sort and store the data messages according to node types, thereby providing support for the fault recorder 50 and the network analyzer and recorder 60.

Optionally, the intelligent substation can further include a time synchronization network, such as a global positioning system (GPS) and/or a Beidou navigation system. The GPS and/or the Beidou navigation system are/is connected to the intelligent power server 20 and the merging unit and intelligent terminal integrated devices 30 for time synchronization.

Optionally, the substation can further include a bay level switch which can be connected to the operator workstation 10.

The protection and control system for an intelligent substation based on the industrial Internet architecture provided by embodiment IV of the disclosure includes the operator workstation, the intelligent power server, the merging unit and intelligent terminal integrated devices, the bays, the fault recorder, the network analyzer and recorder and the firewall. The merging unit and intelligent terminal integrated devices for all bays in the intelligent substation are directly connected to the optical port on the intelligent power server, and the intelligent power server is connected to the operator workstation, so that the special functions, such as the measurement and control, protection, exchange, telecontrol and the like, of the intelligent substation can be integrated into one intelligent power server, and all of the measurement and control function, the protection function, the exchange function and the telecontrol function in the intelligent substation can be realized in a centralized manner, thereby reducing the number of the secondary devices in the substation and further reducing the floor space of the substation. Meanwhile, the intelligent substation further includes the fault recorder, the network analyzer and recorder and the firewall. Therefore, in the case that the system malfunctions, the intelligent substation is ensured to make a response in time, know the change conditions of the various electrical quantities before, during and after the fault in time, and provide supports for maintenance of the maintenance personnel. Moreover, through the firewall, the intelligent substation is prevented from being attacked by the extranet, and steady operation of the intelligent substation is ensured.

Figure 5:
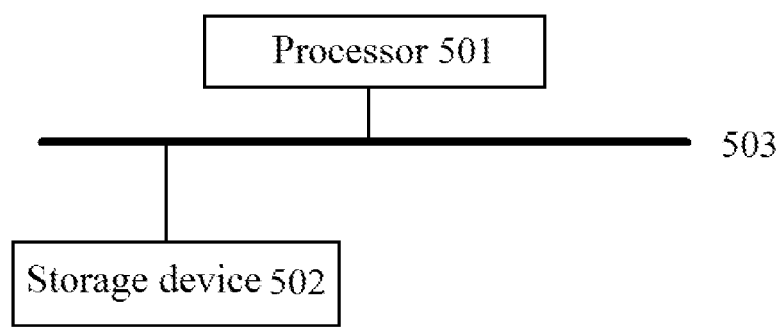
FIG. 5 is a schematic hardware structural diagram illustrating an intelligent power server in the protection and control system for an intelligent substation based on an industrial Internet architecture provided by embodiments of the disclosure.

A schematic hardware configuration of the intelligent power server in the protection and control system for an intelligent substation provided by the embodiments of the present disclosure is explained by referring to FIG. 5. As shown in FIG. 5, the intelligent power server includes a processor 501 and a storage device 502 which are connected via a bus 503. The storage device 502 is stored with computer program instructions executable by the processor 501. The execution of the instructions by the processor 501 causes the intelligent power sever to realize all of a measurement and control function, a protection function, an exchange function and a telecontrol function in the intelligent substation.

It should be noted that, the above descriptions are only embodiments and used technical principles of the disclosure. Those skilled in the art may understand that the disclosure is not limited to specific embodiments herein, and those skilled in the art may carry out various apparent modifications, readjustments and replacements without departing from the protection scope of the disclosure. Therefore, although the disclosure is described in details through the above embodiments, the disclosure is not only limited to the above embodiments, and also can include more other equivalent embodiments without departing from the conception of the disclosure, while the scope of the disclosure is determined by the scope of the attached claims.

What is claimed is:

1. A protection and control system for an intelligent substation based on an industrial Internet architecture, comprising an intelligent power server and merging unit and intelligent terminal integrated devices for all bays in the intelligent substation;

the intelligent power server comprises a processor; and a storage device communicably connected with the processor for storing instructions executable by the processor, wherein execution of the instructions by the processor causes the processor to perform all of a measurement and control function, a protection function, an exchange function and a telecontrol function in the intelligent substation, wherein the intelligent substation adopts a centralized modeling manner of adding and updating all of the protection function, the measurement and control function, the exchange function and the telecontrol function in substation configuration descriptions (SCD) files by taking the whole intelligent substation as a modeling object;

the merging unit and intelligent terminal integrated devices for all bays in the intelligent substation are directly accessed to the intelligent power server, wherein the processor is further caused to collect process level data in real time in a manner of accessing each of the merging unit and intelligent terminal integrated devices to one of transport ports on the intelligent power server through an embedded high-bandwidth switched communication network, perform real-time data processing on the collected process level data, so as to perform all of protection and measurement and control over primary devices connected to the merging unit and intelligent terminal integrated devices;

wherein the SCD files of the intelligent substation are created by a SCD file configuration tool according to the merging unit and intelligent terminal integrated devices and each special function planned by the intelligent substation, and configuration information of each of the special functions is set in the SCD files of the intelligent substation, wherein each of the special functions of the intelligent substation is set according to application scenarios of the intelligent substation;

wherein the processor is further caused to generate configured intelligent electronic device description (CID) files of the intelligent power server according to the SCD files of the intelligent substation; perform all of the measurement and control, protection, exchange and telecontrol functions in the intelligent substation according to the configuration information of each of the special functions, which is obtained by parsing the CID files of the intelligent power server, and the process level data, wherein the process level data is transmitted by the merging unit and intelligent terminal integrated devices, and comprises sampled value (SV) messages and generic object oriented substation event (GOOSE) messages;

wherein when a special function is added or updated in the intelligent substation, configuration information related to the added or updated special function is set in the SCD files of the intelligent substation, and process level virtual terminators of the added or updated special function are associated in the SCD files of the intelligent substation.

2. The protection and control system for an intelligent substation according to claim 1, wherein the processor is further caused to:

perform measurement and control and protection over primary devices connected to all the merging unit and intelligent terminal integrated devices in the intelligent substation, and collect measurement and control information and protection information generated in a measurement and control process and a protection process, transmit the measurement and control information and the protection information to an operator workstation and execute telecontrol control of the primary devices according to instructions from the operator workstation; and perform data exchange between the merging unit and intelligent terminal integrated devices and devices on process level, data exchange between the intelligent power server and the devices on the process level, data exchange among the devices on the process level and data exchange among devices on station level.

3. The protection and control system for an intelligent substation according to claim 1, wherein the transport ports on the intelligent power server and the merging unit and intelligent terminal integrated devices are connected in a relationship of one-to-one correspondence.

4. The protection and control system for an intelligent substation according to claim 2, wherein the transport ports on the intelligent power server and the merging unit and intelligent terminal integrated devices are connected in a relationship of one-to-one correspondence.

5. The protection and control system for an intelligent substation according to claim 1, wherein the transport ports on the intelligent power server and the merging unit and intelligent terminal integrated devices are connected in a relationship of one-to-one correspondence.

6. The protection and control system for an intelligent substation according to claim 1, wherein the transport ports on the intelligent power server and the merging unit and intelligent terminal integrated devices are connected in a relationship of one-to-one correspondence.

7. The protection and control system for an intelligent substation according to claim 1, wherein the intelligent power server is further provided with a fault recorder and a network analyzer and recorder.

8. The protection and control system for an intelligent substation according to claim 1, further comprising a fault recorder and a network analyzer and recorder, wherein each of the fault recorder, the network analyzer and recorder and the intelligent power server are separately provided.

9. The protection and control system for an intelligent substation according to claim 1, wherein the intelligent power server is a main intelligent power server, and the protection and control system further comprises a backup intelligent power server, main/backup output signals of main/backup switching interfaces of the main intelligent power server are connected to input of the backup intelligent power server, main/backup input signals of the main/backup switching interfaces of the main intelligent power server are connected to output of the backup intelligent power server, and the main/backup input signals and the main/backup output signals are exclusive to each other, wherein the main intelligent power server and the backup intelligent power server work simultaneously and are configured to perform the same function, and when in operation, one of the main intelligent power server and the backup intelligent power server outputs effectively.

10. The protection and control system for an intelligent substation according to claim 1, wherein the processor is further caused to assign Internet protocol (IP) addresses to the accessed intelligent primary devices, wherein the intelligent primary devices comprise the merging unit and intelligent terminal integrated devices, merging units and intelligent terminals; and the storage device stores a mapping relationship between a media access control (MAC) address and the IP address of each of the intelligent primary devices.

11. The protection and control system for an intelligent substation according to claim 10, wherein, in a process of collecting the measurement and control information and protection information, the processor is further caused to replace the MAC addresses in the measurement and control information and protection information with corresponding IP addresses according to the mapping relationship between the MAC addresses and the IP addresses of the intelligent primary devices, and transmit the measurement and control information and protection information including the IP addresses to the operator workstation.

12. The protection and control system for an intelligent substation according to claim 1, further comprising: an operator workstation;
the intelligent power server is connected to the operator workstation, and the operator workstation is configured to monitor and manage the operation of the intelligent substation through the intelligent power server.

13. The protection and control system for an intelligent substation according to claim 2, further comprising: an operator workstation;
the intelligent power server is connected to the operator workstation, and the operator workstation is configured to monitor and manage the operation of the intelligent substation through the intelligent power server.

14. The protection and control system for an intelligent substation according to claim 1, further comprising: an operator workstation;
the intelligent power server is connected to the operator workstation, and the operator workstation is configured to monitor and manage the operation of the intelligent substation through the intelligent power server.

15. The protection and control system for an intelligent substation according to claim 1, further comprising: an operator workstation;
the intelligent power server is connected to the operator workstation, and the operator workstation is configured to monitor and manage the operation of the intelligent substation through the intelligent power server.

* * * * *